United States Patent
Van Nieuwenhuyze

(10) Patent No.: US 12,056,785 B2
(45) Date of Patent: *Aug. 6, 2024

(54) ELECTRONIC SYSTEM

(71) Applicant: Proton World International N.V., Diegem (BE)

(72) Inventor: Olivier Van Nieuwenhuyze, Wezembeek-Oppem (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,210

(22) Filed: Jan. 23, 2023

(65) Prior Publication Data

US 2023/0162313 A1     May 25, 2023

Related U.S. Application Data

(63) Continuation of application No. 16/825,220, filed on Mar. 20, 2020, now Pat. No. 11,593,905.

(30) Foreign Application Priority Data

Mar. 25, 2019   (FR) ...................................... 1903066

(51) Int. Cl.
*G06F 21/70*       (2013.01)
*G06F 13/20*       (2006.01)
(Continued)

(52) U.S. Cl.
CPC ............. *G06Q 50/40* (2024.01); *G06F 13/20* (2013.01); *G06F 13/4282* (2013.01);
(Continued)

(58) Field of Classification Search
CPC .. G06Q 50/30; G06Q 20/3278; G06Q 20/352; G06Q 2240/00; G06F 13/20;
(Continued)

(56) References Cited

U.S. PATENT DOCUMENTS 6,278,697 B1   8/2001  Brody et al.
7,232,063 B2   6/2007  Fandel et al.
(Continued)

FOREIGN PATENT DOCUMENTS

CA     2831158 A1    10/2012
CA     2794850 A1     6/2013
(Continued)

OTHER PUBLICATIONS

Anwar, Waqar et al., "Redesigning Secure Element Access Control for NFC Enabled Android Smartphones using Mobile Trusted Computing", IEEE International Conference on Information Society (i-Society 2013), Jun. 24-26, 2013, 8 pages.

(Continued)

*Primary Examiner* — Tuyen K Vo
(74) *Attorney, Agent, or Firm* — Slater Matsil, LLP

(57) ABSTRACT

In accordance with an embodiment, an electronic device includes a secure element configured to implement a plurality of operating systems; and a near field communication module coupled to the secure element by a single bus and by a routing circuit configured to route routing data between the plurality of operating systems and a receive circuit of the near field communication module.

20 Claims, 5 Drawing Sheets

(51) Int. Cl.
  *G06F 13/42* (2006.01)
  *G06F 21/77* (2013.01)
  *G06K 7/10* (2006.01)
  *G06Q 20/32* (2012.01)
  *G06Q 20/34* (2012.01)
  *G06Q 50/40* (2024.01)
  *H04B 5/72* (2024.01)

(52) U.S. Cl.
  CPC ......... *G06F 21/77* (2013.01); *G06K 7/10297* (2013.01); *G06Q 20/3278* (2013.01); *G06Q 20/352* (2013.01); *H04B 5/72* (2024.01); *G06Q 2240/00* (2013.01)

(58) Field of Classification Search
  CPC .... G06F 13/4282; G06F 21/77; G06F 21/606; G06F 21/85; G06F 21/74; G06K 7/10297; H04B 5/0031; H04W 4/80; H04W 12/45; H04L 45/745
  See application file for complete search history.

(56) References Cited

U.S. PATENT DOCUMENTS

| | | |
|---|---|---|
| 9,003,173 B2 | 4/2015 | Baribault et al. |
| 10,186,749 B1 | 1/2019 | O'Donoghue et al. |
| 10,511,626 B2 | 12/2019 | Huque et al. |
| 2008/0313282 A1 | 12/2008 | Warila et al. |
| 2009/0199206 A1 | 8/2009 | Finkenzeller et al. |
| 2011/0078081 A1 | 3/2011 | Pirzadeh et al. |
| 2012/0135710 A1 | 5/2012 | Schell et al. |
| 2013/0040566 A1 | 2/2013 | Mourtel et al. |
| 2013/0166938 A1* | 6/2013 | Palaniappan ............ G06F 1/12 713/400 |
| 2014/0079074 A1* | 3/2014 | Tune ....................... H04L 12/46 370/401 |
| 2014/0156872 A1 | 6/2014 | Buer et al. |
| 2014/0227972 A1 | 8/2014 | Swaminathan et al. |
| 2014/0279546 A1 | 9/2014 | Poole et al. |
| 2015/0033290 A1 | 1/2015 | Benyo et al. |
| 2015/0089586 A1 | 3/2015 | Ballesteros |
| 2015/0280787 A1 | 10/2015 | Lerch et al. |
| 2016/0026993 A1 | 1/2016 | Kang |
| 2016/0094930 A1 | 3/2016 | Ramanna et al. |
| 2016/0227012 A1 | 8/2016 | Chai et al. |
| 2016/0309285 A1 | 10/2016 | Charles |
| 2016/0358172 A1 | 12/2016 | Ziat et al. |
| 2016/0360352 A1 | 12/2016 | Khan et al. |
| 2017/0055109 A1 | 2/2017 | Van Nieuwenhuyze et al. |
| 2017/0249628 A1 | 8/2017 | Douglas et al. |
| 2017/0315947 A1* | 11/2017 | Andrews ............. G06F 13/4031 |
| 2018/0060864 A1 | 3/2018 | Taveau et al. |
| 2018/0068301 A1 | 3/2018 | Abdulrahiman et al. |
| 2018/0107822 A1 | 4/2018 | Boulanger et al. |
| 2018/0139596 A1 | 5/2018 | Chen et al. |
| 2018/0349886 A1 | 12/2018 | Blakesley et al. |
| 2019/0205492 A1* | 7/2019 | Roberts ................... H01L 25/18 |
| 2019/0227716 A1* | 7/2019 | Teh ........................ G06F 3/0611 |
| 2020/0301604 A1* | 9/2020 | Abali .................... G11C 7/1075 |
| 2021/0182077 A1* | 6/2021 | Chen ......................... G06T 1/60 |

FOREIGN PATENT DOCUMENTS

| | | |
|---|---|---|
| CN | 1687905 A | 10/2005 |
| CN | 101627377 A | 1/2010 |
| CN | 202306531 U | 7/2012 |
| CN | 103222291 A | 7/2013 |
| CN | 103491589 A | 1/2014 |
| CN | 104102610 A | 10/2014 |
| CN | 104115173 A | 10/2014 |
| CN | 104462010 A | 3/2015 |
| CN | 104618585 A | 5/2015 |
| CN | 104769985 A | 7/2015 |
| CN | 105393571 A | 3/2016 |
| CN | 105591672 A | 5/2016 |
| CN | 106470049 A | 3/2017 |
| CN | 106570695 A | 4/2017 |
| CN | 107409122 A | 11/2017 |
| CN | 107846238 A | 3/2018 |
| CN | 107911319 A | 4/2018 |
| CN | 109218030 A | 1/2019 |
| CN | 211127902 U | 7/2020 |
| CN | 211557320 U | 9/2020 |
| EP | 2672735 A1 | 12/2013 |
| EP | 1763199 B1 | 1/2017 |
| EP | 3422197 A1 | 1/2019 |
| FR | 2969341 A1 | 6/2012 |
| KR | 1020110005991 A | 1/2011 |

OTHER PUBLICATIONS

Globalplatform, "TEE Protection Profile—Public Release v1.0", GPD_SPE_021, Aug. 2013, 92 pages.

* cited by examiner

ELECTRONIC SYSTEM

CROSS-REFERENCE TO RELATED APPLICATIONS

This application is a continuation application os U.S. patent application Ser. No. 16/825,220, filed Mar. 20, 2020, which application claims priority to French Patent Application No. 1903066, filed on Mar. 25, 2019, which applications are hereby incorporated herein by reference in its entirety.

TECHNICAL FIELD

The present disclosure generally concerns electronic devices. The present disclosure more particularly applies to an electronic component capable of implementing a plurality of different operating systems.

BACKGROUND

Complex electronic devices, such as cell phones, tablet computers, computers, etc. integrate, over time, more and more functionalities and enable to implement digital services in order to integrate at best to everyday life. As an example, certain cell phones, and more particularly smart phones, integrated digital services such as a bank payment service, or also a service of use of public transport tickets, event tickets, an authentication of the user by a remote system (bank, public administration, etc.). To implement such functionalities, the devices may integrate electronic components specific to these functionalities, such as for example secure components which enable to keep/store identification, reference, and authentication information, generally called "credentials", and assets of the digital service provider, motion sensors, a near field communication module (NFC), etc.

A difficulty resulting from the addition of new functionalities is that this may compel certain electronic components to implement a plurality of, at least two, operating systems. Further, difficulties may arise from the cohabitation of a plurality of operating systems with different components/peripherals which are connected thereto.

SUMMARY

In accordance with an embodiment, an electronic device includes a secure element configured to implement a plurality of operating systems; and a near field communication module coupled to the secure element by a single bus and by a routing circuit configured to route routing data between the plurality of operating systems and a receive circuit of the near field communication module.

In accordance with another embodiment, a method of operating an electronic device including a secure element and a near field communication module coupled to the secure element by a single bus includes: executing a plurality of operating systems on the secure element; and exchanging, by a routing circuit, routing data between the plurality of operating systems being executed on the secure element and a receive circuit of the near field communication module.

In accordance with a further embodiment, a cell phone includes a secure element configured to execute a first operating system implementing a public transport card service and a second operating system implementing a payment card; a near field communication module; a routing circuit coupled between the secure element and the near field communication module; and a single bus coupled in series with the routing circuit.

DETAILED DESCRIPTION OF ILLUSTRATIVE EMBODIMENTS

Figure 1:
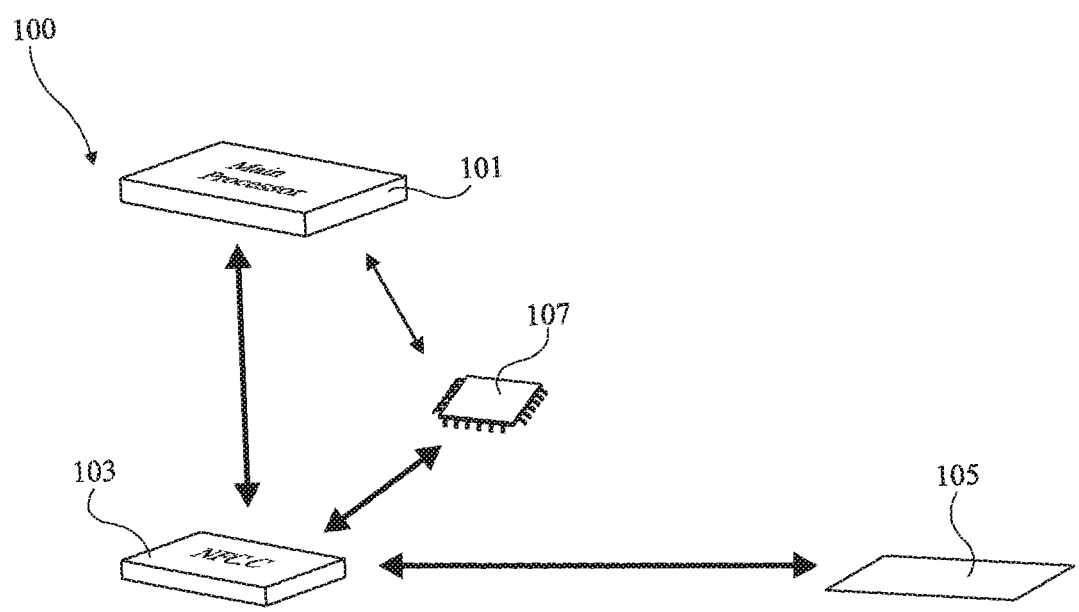
FIG. 1 schematically shows electronic circuits of an electronic device.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the embodiments described hereafter are adapted to the standard near field communication (NFC) technology. This technology will not be described hereafter.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

It would be desirable to be able to at least partly improve certain aspects of known complex electronic devices such as cell phones, and more particularly to be able to at least partly improve certain aspects of the cohabitation of a plurality of operating systems on a same electronic component. Accordingly, there is a need for an electronic component adapted to the cohabitation of a plurality of operating systems and of their applications, and there is a need for an electronic device comprising a near field communication (NFC) module, adapted to the cohabitation of a plurality of operating systems.

An embodiment overcomes all or part of the disadvantages of known electronic devices comprising a plurality of operating systems and a near field communication module.

An embodiment provides an electronic device comprising at least one secure element capable of implementing at least two operating systems, and at least one near field communication module coupled to the one secure element by a single bus and by a routing circuit routing data between the operating systems.

According to an embodiment, the routing circuit is a state machine.

According to an embodiment, the state machine forms part of the secure element.

According to an embodiment, the routing circuit is a routing table.

According to an embodiment, the routing table forms part of the near field communication module.

According to an embodiment, the routing circuit is capable of storing parameters characterizing one of the operating systems.

According to an embodiment, the parameters are used for each new use of the operating system.

According to an embodiment, each output of the routing circuit is coupled to a conversion circuit.

According to an embodiment, the near field communication module contains information representative of the number of operating systems present in the secure element.

According to an embodiment, the bus between the secure element and the near field communication module is a bus having its type and its associated protocol selected from the group: single-wire type, MIPI DSI type, I2C type, I3C type, SPI type.

According to an embodiment, a first group of the conductors of the bus is capable of transmitting data intended for a first operating system, and a second group of the conductors of the bus is capable of transmitting data intended for a second operating system.

According to an embodiment, each operating system ignores the existence of other operating systems sharing the bus.

According to an embodiment, the device is a cell phone.

According to an embodiment, one of the operating systems is the operating system of a SIM card or of a payment card.

According to an embodiment, one of the operating systems is the operating system of a public transport card.

The foregoing and other features and advantages will be discussed in detail in the following non-limiting description of specific embodiments in connection with the accompanying drawings.

FIG. 1 schematically shows some of the electronic circuits of an electronic device 100. Device 100 is for example a cell phone, for example, of smart phone type, a touch tablet or a tablet computer, etc.

According to an embodiment, device 100 comprises an electronic component (107) capable of implementing a plurality of operating systems, for example, at least two. Device 100 is compatible with the near field communication (NFC) technology. Thus, device 100 comprises, among others, at least one processor 101, at least one near field communication module, NFC controller, or NFC module, 103, at least one antenna 105, and at least one secure element 107.

Processor 101 is, for example, considered as the main processor of device 100. Processor 101 is capable of executing orders, transmitted, for example, by secure element 107 or by NFC module 103. Processor 101 is further capable of executing other orders and functionalities of other components of device 100.

NFC module 103 is capable of transmitting and of receiving data via antenna 105. NFC module 103 is further capable of transmitting and receiving data and/or control signals from processor 101 and secure element 107.

Antenna 105 is adapted to the near field communication technology.

Secure element 107 is capable of receiving and of transmitting data to NFC module 103 and to processor 101. Secure element 107 enables to implement secure functionalities of device 100. Secure element 107 is, for example, an embedded secure element (eSE) or an integrated secure element (iSE). Secure element 107 may be implemented, for example, using circuitry, such as a processor, capable of executing software code such as an operating system.

According to an embodiment, secure element 107 is capable of implementing a plurality of, at least two, operating systems. Each operating system has no knowledge of the other operating systems which cohabitate therewith on the same electronic component. It cannot communicate, interact, or access the data of the other operating systems. In other words, when it is "activated", an operating system believes that it is the only one to be able to access the components of device 100. As an example, in the case where device 100 is a cell phone, the main operating system or first operating system is that of a SIM (Subscriber Identity Module) card, where identification information of the owner of the phone are stored, as well as other information enabling to connect/register the device in a mobile network. The first operating system may, possibly, contain other services such as a public transport card service. In this case, a digital application may be supplied by the operating system of the public transport card by using a bus, for example, a single-wire bus, to establish the communication between NFC module 103 and secure element 107. As an example, in this case, a second operating system may be an operating system of a payment card.

Thus, with a plurality of operating systems, device 100 may, according to the situations of use, provide the functionalities linked either to the first or to the second operating system. In other words, the device may, for example, be used as a payment card or as a public transport card.

Figure 2:
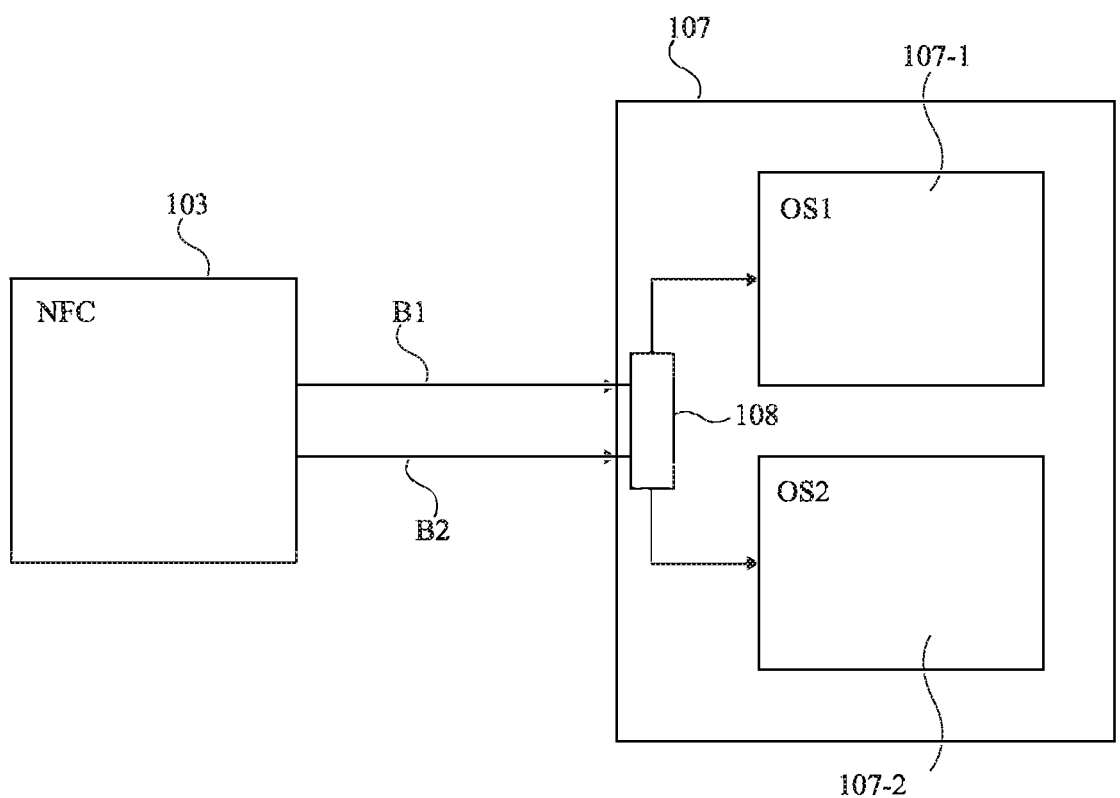
FIG. 2 schematically shows in the form of blocks a NFC module and a secure element of an embodiment of an electronic device.
Figure 3:
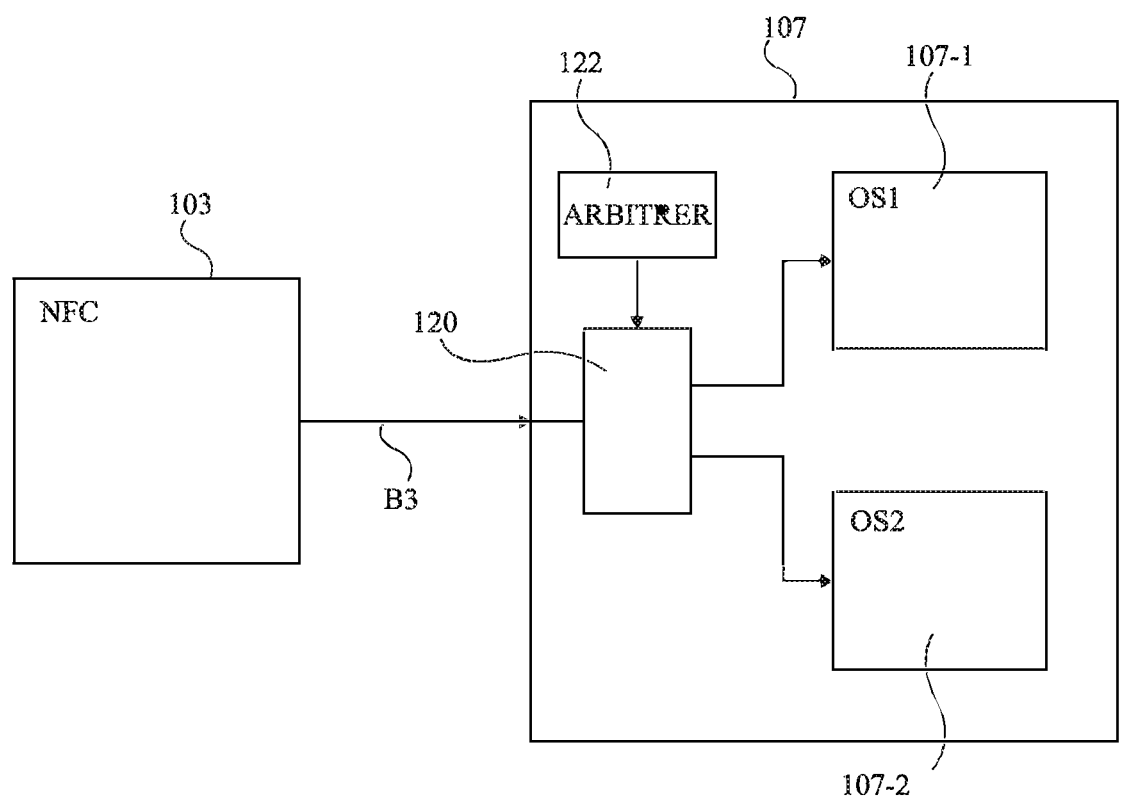
FIG. 3 schematically shows in the form of blocks a NFC module and a secure element of another embodiment of an electronic device.
Figure 4:
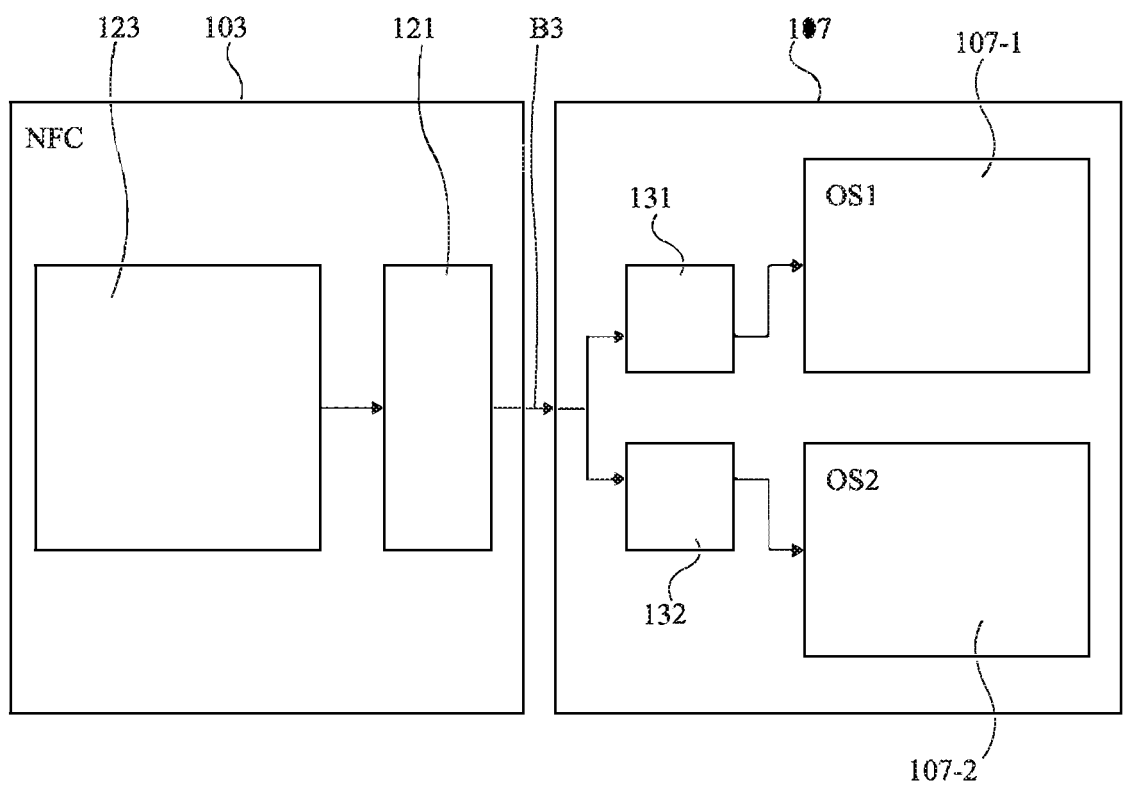
FIG. 4 schematically shows in the form of blocks a NFC module and a secure element of another embodiment of an electronic device.

Different connection circuits between secure element 107 and NFC module 103 will be detailed in relation with FIGS. 2 to 4.

FIG. 2 schematically shows in the form of blocks an embodiment of connection circuits between NFC module (NFC) 103 and secure element 107 of the embodiment of device 100 described in relation with FIG. 1. Element 107 is capable of implementing two operating systems, each symbolized by a block bearing reference (OS1) 107-1, (OS2) 107-2. Secure element 107 comprises and implements an interface, or interface layer, or abstraction layer, 108 of the communication bus.

In this embodiment, NFC module 103 is coupled to secure element 107 via two buses B1 and B2. Each bus B1, B2 is capable of transmitting and of receiving data and control signals relative to a single operating system or to an application executed from the application system. In the case of FIG. 2, NFC module (NFC) 103 is capable of routing the data towards the adequate bus B1, B2. As an example, NFC module 103 may use part of the data or of the control signals to know towards which operating system it should be directed. As an example, buses B1 and B2 are single-wire buses using a single-wire bus protocol, SWP, or are multiple-wire buses using a multiple-wire bus protocol of MIPI DSI type (Mobile Industry Processor Interface Display Serial Interface), of I2C type (Inter-Integrated Circuit), of I3C type (a development of the I3C type), or of SPI type (Serial Peripheral Interface). As a variation, the buses are formed of any appropriate communication support between the near field communication module and the secure element.

Abstraction layer 108 for example enables operating system 107-1 to send control signals via the bus without having to be concerned about whether it should use bus B1 or B2. Operating system 107-1 only sees (for itself) the existence of a bus. Interface layer 108 thus enables to establish the relation between the operating system/bus pairs 107-1/B1 and 107-2/B2, without for each operating system 107-1, 107-2 to know that the other one exists. For this purpose, an embodiment comprises the modeling/creation, by layer 108, of a routing or translation table between the pairs. Operating systems 107-1 and 107-2, when they communicate over bus B1 or B2, talk to the bus in "generic" fashion. In other words, the two operating systems 107-1 and 107-2 do not know the existence of the two buses B1 and B2. For each of them, there exists a single bus. Layer 108 may for example limit the number of operating systems (or the number of operating systems requiring access to the bus that it manages) to the number of available communication buses required by the operating systems, which may be useful in the case where the number of buses is smaller than the number of operating systems managed by the secure element. According to an embodiment, NFC module 103 data contains information representative of the number of operating systems implemented by secure element 107.

According to an alternative embodiment, device 100 may comprise a secure element capable of implementing more than two operating systems capable of receiving data from and/or transmitting data to the NFC module. In this case, the NFC module may be connected to the secure element by as many buses as there are operating systems implemented by the secure element.

FIG. 3 schematically shows in the form of blocks an embodiment of connection circuits between NFC module 103 and secure element 107 of the embodiment of device 100 described in relation with FIG. 1. As in FIG. 2, element 107 is capable of implementing two operating systems, each symbolized by a block bearing reference (OS1) 107-1, (OS2) 107-2.

In this embodiment, NFC module 103 is coupled to secure element 107 via a single bus B3 which transmits data and control signals indifferently intended for the two operating systems. Secure element 107 comprises a routing/abstraction layer 120, or routing circuit, enabling to direct the data and control signals towards the concerned operating system. Routing circuit 120 further allows to modify or to adapt data and control signals transmitted by circuit 120 to the operating systems, so that each operating system has no knowledge of the existence of the other operating systems. Doing so, each operating system believes or considers that it is the only one to operate the secure element 107. The routing/abstraction layer is driven by an external arbitration entity (ARBITER) 122, or arbiter, which is controlled, for example, by main processor 101. Such an arbiter interacts with secure element 107, and more particularly with routing/abstraction layer 120, to signify thereto which operating system will be in charge of processing the incoming data. The routing/abstraction layer also has the function that, when an operating system is activated for the first time, the operating system will want to configure the NFC controller with its own parameters (as defined in standard ETSI TS 102 622). When another operating system will be activated for the first time, it will also have to configure the NFC module with its own parameters. Without the routing circuit, this last operation would erase the configuration of the first operating system. The routing layer should thus "store" the configuration achieved by each operating system and recharge it into the NFC controller for each change of activation of a different operating system. The routing circuit may take a plurality of forms and may vary according to the application, but the stored configuration remains usable and internally stored by the routing circuit, which can then complete it with new configuration information supplied by each operating system for the NFC controller. In the embodiment illustrated in FIG. 3, the routing circuit is a state machine comprising an input, coupled to bus B3, and two outputs, each in communication with an operating system of secure element 107-1, 107-2.

According to an embodiment, device 100 may comprise a secure element capable of implementing more than two operating systems, in this case, the routing circuit comprises as many outputs as there are operating systems capable of receiving data from and/or transmitting data to the NFC module and implemented by secure element 107.

Routing circuit 120 uses, for example, information contained in the data or the control signals to determine which operating system is the addressee thereof. According to an embodiment, the routing circuit may be controlled by secure element 107 or by NFC module 103 to direct the data towards the concerned operating system 107-1, 107-2. The routing circuit is particularly used to assign pipes to ports of the NFC router. The routing circuit created by routing/translation layer 120 is for example implemented by a lookup table, for example, stored in a non-volatile memory. According to a variation, routing circuit 120 may be implemented by a state machine.

FIG. 4 schematically shows in the form of blocks an embodiment of an architecture for coupling NFC module 103 and secure element 107 of the embodiment of device 100 described in relation with FIG. 1. As in FIGS. 2 and 3, element 107 is capable of implementing two operating systems, each symbolized by a block designated with reference (OS1) 107-1, (OS2) 107-2.

In this embodiment, NFC module 103 is coupled to secure element 107 via a single bus B3 which indifferently transmits data and control signals intended for the two operating systems. The data and control signals are directed by a routing circuit 121 comprised within NFC module 103 towards the concerned operating system. In the embodiment illustrated in FIG. 4, routing circuit 121 comprises an input, receiving data from a receive circuit 123, and an output, coupled to bus B3. According to an alternative embodiment, device 100 may comprise a secure element capable of implementing more than two operating systems, in this case, routing circuit 121 comprises as many outputs as there are operating systems capable of receiving data from and/or transmitting data to the NFC module and implemented by the secure element. According to an embodiment, routing circuit 121 is a routing table. NFC module 103 generally comprises a routing table, but routing table 121 is an additional routing table. If the system supports an undetermined number of operating systems, the NFC module is informed thereof (for example, during the establishing of the communication with module 107 or processor 101) to target a specific operating system 107-1 or 107-2 and not generally secure element 107.

Routing circuit 121 for example uses information contained in the data or the control signals to determine which operating system is the addressee thereof. Routing circuit 121 is for example implemented by a lookup table, for example, stored in a non-volatile memory, interpreted by conversion circuits 131 and 132.

Conversion circuits 131 and 132 are data conversion circuits capable of converting the received data and control signals so that they become comprehensible and executable by the concerned operating system, and so that the conversion circuits remove routing data or control signals which would have been added by the NFC controller. Similarly, if a message should be sent from a specific operating system (107-1 or 107-2), conversion circuits 131 and 132 have to add the information necessary for the routing. As an example, conversion circuits 131 and 132 are partially or totally comprised within secure element 107. Conversion circuits 131, 132 thus allow to let each operating system 107-1, 107-2 to consider that it is the only one to be able to operate the secure element 107. Indeed, each operating system only receive data and control signals, which are directly intended to this operating system and which it is capable of interpreting and/or implementing.

According to an alternative embodiment, since bus B3 may be formed of a plurality of conductors, a first group of conductors may be delegated to the transmission of data and control signals concerning a single operating system 107-1 and a second group of data may be delegated to the transmission of data and control signals to the other operating system.

Figure 5:
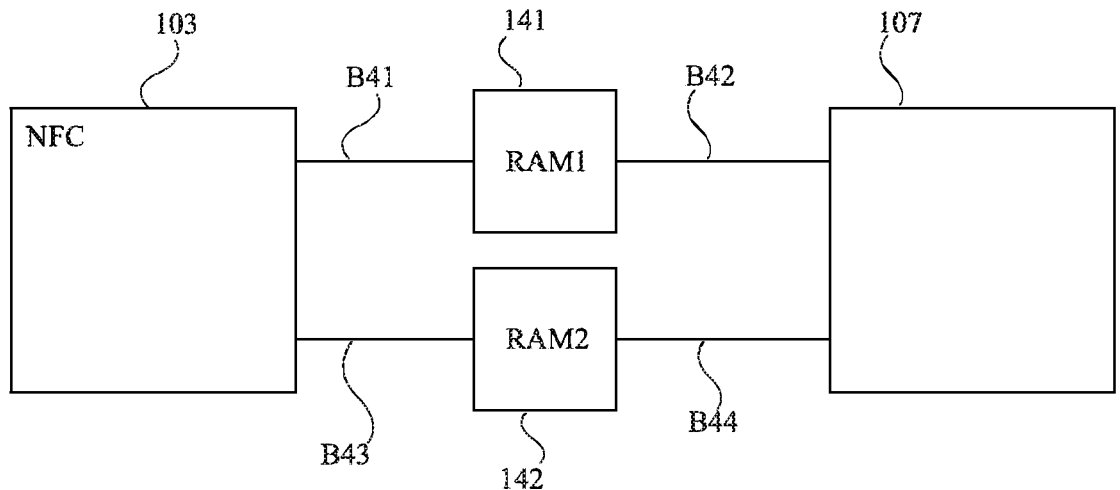
FIG. 5 schematically shows in the form of blocks a NFC module and a secure element of another embodiment of an electronic device.

FIG. 5 schematically shows in the form of blocks another embodiment of connection circuits between NFC module 103 and secure element 107 of the embodiment of device 100 described in relation with FIG. 1. Element 107 is capable of implementing two operating systems called OS1 and OS2, and is identical to element 107 described in relation with FIG. 2. Thus, element 107 comprises abstraction layer 108.

The embodiment described herein is an alternative embodiment of the embodiment described in relation with FIG. 2, where buses B1 and B2 are each replaced with a memory. More particularly, each bus B1, B2 is replaced with a volatile memory 141 (RAM1), 142 (RAM2). Each memory 141, respectively 142, is coupled to NFC module 103 by a bus B41, respectively B43, and is coupled to element 107 by a bus B42, respectively B44. Volatile memories 141 and 142 may be implemented, for example, using volatile memory circuits known in the art including, but not limited to random access memory (RAM), dynamic random access memory (DRAM), and static random access memory (SRAM).

In this embodiment, NFC module (NFC) 103 is capable of routing the data towards the adequate memory 141, 142.

In this embodiment, the data sent by NFC module 103 to element 107, and intended for operating system OS1 are, first, transmitted, by bus B41, and then written into memory 141 by NFC module 103. Then, element 107 recovers the data from memory 141, via bus B42. The data then reach the level of abstraction layer 108 as described in relation with FIG. 2.

Similarly, the data sent by NFC module 103 to element 107, and intended for operating system OS2 are, first, transmitted, by bus B43, and then written into memory 142 by NFC module 103. Then, element 107 recovers the data from memory 142, via bus B44. The data then reach the level of abstraction layer 108 as described in relation with FIG. 2.

According to an embodiment, volatile memories 141 and 142 are two memory areas of a same volatile memory.

Figure 6:
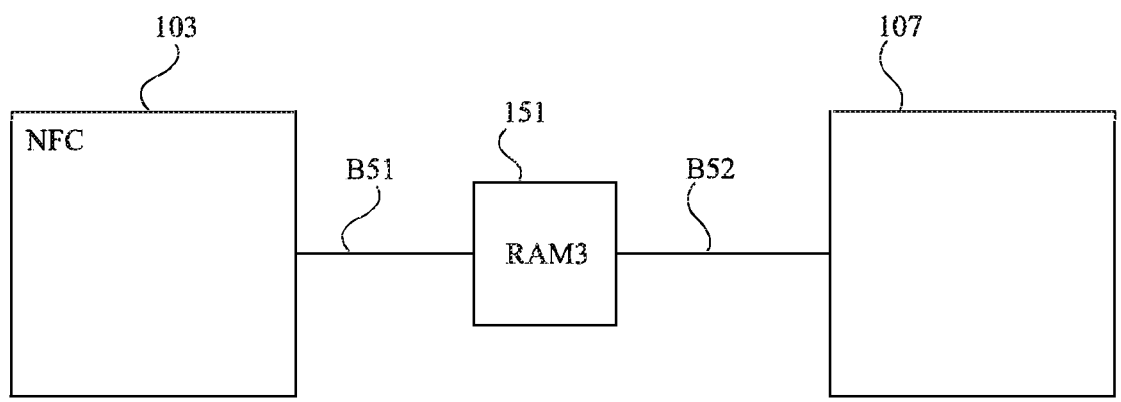
FIG. 6 schematically shows in the form of blocks a NFC module and a secure element of another embodiment of an electronic device.

FIG. 6 schematically shows in the form of blocks another embodiment of connection circuits between NFC module 103 and secure element 107 of the embodiment of device 100 described in relation with FIG. 1.

The embodiment described herein is an alternative embodiment of the embodiments described in relation with FIGS. 3 and 4, where bus B3 is replaced with a volatile memory. More particularly, bus B3 is replaced with a volatile memory 151 (RAM3), coupled to NFC module 103 by a bus B51 and to element 107 by a bus B52.

In such variations, the data sent by NFC module 103 to element 107 are, first, transmitted by bus B51, and then written into memory 151 by NFC module 103. Then, element 107 recovers the data from memory 151, via bus B52.

The NFC module and element 107 may be identical to the NFC module and to the element 107 described in relation with FIG. 3 or may be identical to the NFC module and to the element 107 described in relation with FIG. 4.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereinabove.

What is claimed is:

1. An electronic device comprising:
 a secure element configured to implement a plurality of operating systems;
 a near field communication module coupled to the secure element by a single bus and by a routing circuit configured to route routing data between the plurality of operating systems and a receive circuit of the near field communication module; and
 an arbiter coupled to the routing circuit,
 wherein each output of the routing circuit is coupled to a respective conversion circuit, and each respective conversion circuit is configured to convert data or control signals received from the routing circuit to a format compatible with a respective operating system of the plurality of operating systems, and wherein the respective conversion circuits are totally comprised within the secure element.

2. The device of claim 1, wherein the routing circuit is a state machine.

3. The device of claim 2, wherein the secure element comprises the state machine.

4. The device of claim 1, wherein the routing circuit is a routing table.

5. The device of claim 4, wherein the near field communication module comprises the routing table.

6. The device of claim 1, wherein the routing circuit is configured to store parameters characterizing one operating system of the plurality of operating systems.

7. The device of claim 6, wherein the parameters are used for each new use of the operating system.

8. The device of claim 1, wherein the near field communication module contains information representative of a number of operating systems of the plurality of operating systems present in the secure element.

9. The device of claim 1, wherein the bus between the secure element and the near field communication module is a bus having its type and its associated protocol selected from the group consisting of: single-wire type (SWP), MIPI DSI type, I2C type, I3C type or SPI type.

10. The device of claim 1, wherein a first group of conductors of the bus is delegated for transmitting data intended for a first operating system of the plurality of operating systems and a second group of conductors of the bus is delegated for transmitting data intended for a second operating system of the plurality of operating systems.

11. The device of claim 1, wherein each operating system of the plurality of operating systems is configured to ignore an existence of other operating systems of the plurality of operating systems sharing the bus.

12. The device of claim 1, wherein the electronic device is a cell phone.

13. The device of claim 1, wherein one operating system of the plurality of operating systems is an operating system of a SIM card or of a payment card.

14. The device of claim 1, wherein one operating system of the plurality of operating systems is an operating system of a public transport card.

15. A method of operating an electronic device comprising a secure element and a near field communication module coupled to the secure element by a single bus, the method comprising:
executing a plurality of operating systems on the secure element;
exchanging, by a routing circuit, routing data between the plurality of operating systems being executed on the secure element and a receive circuit of the near field communication module;
driving the routing circuit with an arbiter; and
converting data or control signals received from the routing circuit to a format compatible with a respective operating system of the plurality of operating systems with a plurality of conversion circuits, wherein the plurality of conversion circuits are totally comprised within the secure element.

16. The method of claim 15, wherein the routing circuit comprises a state machine and exchanging the routing data comprises operating the state machine.

17. The method of claim 15, wherein the routing circuit comprises a routing table, and exchanging the routing data comprises using the routing table.

18. The method of claim 15, further comprising storing, by the routing circuit, parameters characterizing one operating system of the plurality of operating systems.

19. The method of claim 15, further comprising:
transmitting data intended for a first operating system of the plurality of operating systems via a first group of conductors of the bus; and
transmitting data intended for a second operating system of the plurality of operating systems of via a second group of conductors of the bus.

20. An electronic device comprising:
a secure element configured to implement a plurality of operating systems;
a near field communication module coupled to the secure element by first and second volatile memories external to the near field communication module, and by a routing circuit configured to route routing data between the plurality of operating systems and a receive circuit of the near field communication module, and wherein the first and second volatile memories are external to the secure element; and
a conversion circuit configured to convert data or control signals received from the routing circuit to a format compatible with a respective operating system of the plurality of operating systems, and wherein the conversion circuit is totally comprised within the secure element.

* * * * *